No. 669,457. Patented Mar. 5, 1901.
G. C. DAVISON.
SPEED INDICATOR.
(Application filed Sept. 27, 1900.)
(No Model.)

Witnesses.
Percy C. Bowen
John Chalmers Wiley

Inventor
G. C. Davison
by Wilkinson & Fisher
Attorneys

UNITED STATES PATENT OFFICE.

GREGORY CALDWELL DAVISON, OF THE UNITED STATES NAVY.

SPEED-INDICATOR.

SPECIFICATION forming part of Letters Patent No. 669,457, dated March 5, 1901.

Application filed September 27, 1900. Serial No. 31,300. (No model.)

*To all whom it may concern:*

Be it known that I, GREGORY CALDWELL DAVISON, lieutenant United States Navy, stationed at New York, in the county of New York and State of New York, have invented certain new and useful Improvements in Speed-Indicators; and I do hereby declare the following to be a full, clear, and exact description of the invention, such as will enable others skilled in the art to which it appertains to make and use the same.

My invention relates to improvements in devices for indicating the speed of a rotating shaft; and it has for its object to produce a speed-indicator of this class which may be used for accurately determining the speed of rotation of a shaft in various sorts of machinery.

My invention, broadly stated, consists in the employment of a loosely-mounted spherical body which is given rotation from a shaft whose velocity of rotation is constant and known and also given a rotation at right angles to the rotation of said constant shaft from the shaft the speed of rotation of which is to be measured.

The details and the arrangements of parts are hereinafter fully described and are illustrated in the accompanying drawings, wherein the same parts are indicated by the same letters throughout both views.

Figure 1:
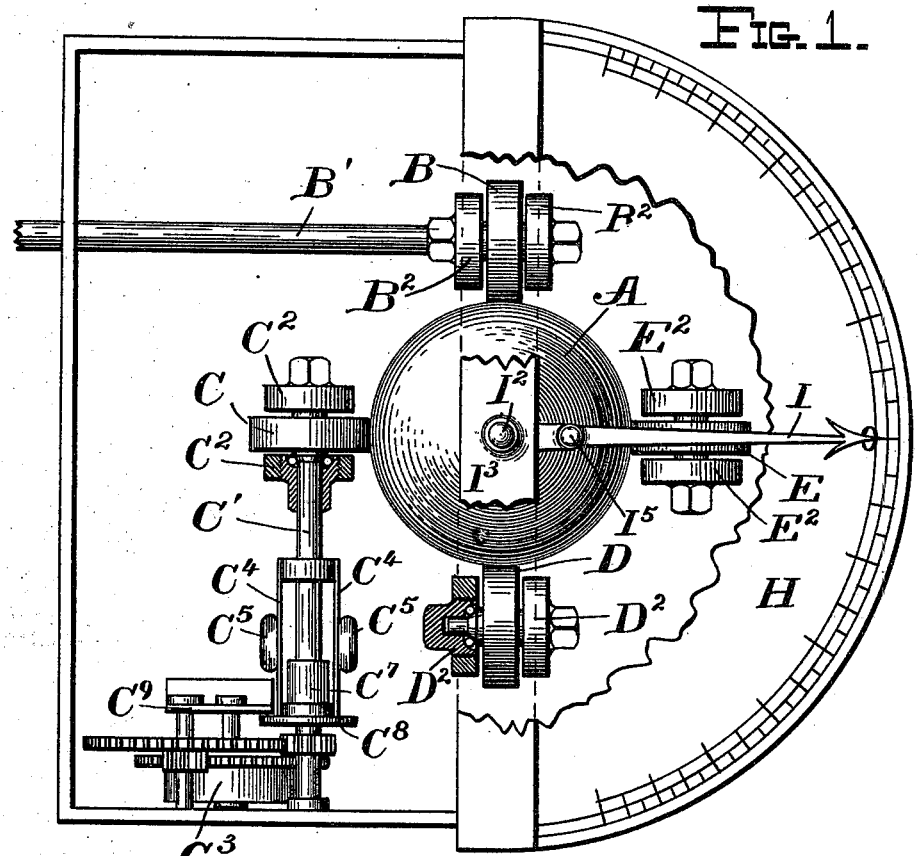
Figure 2:
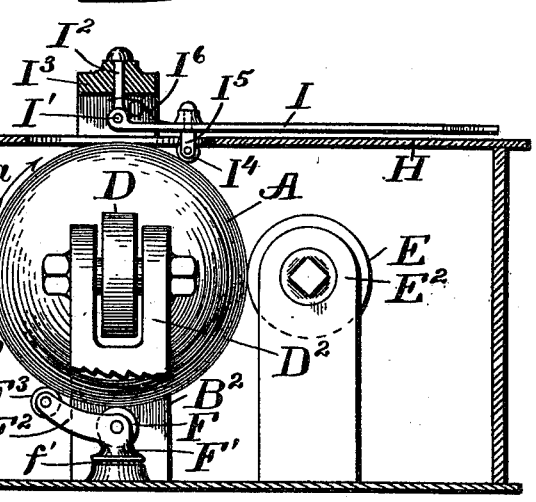

Figure 1 represents a top plan view of the apparatus for indicating the speed of rotation of a shaft; and Fig. 2 is a view in side elevation looking toward the top of the sheet, parts being shown in section.

A represents a light hollow true sphere, preferably of such metal as brass or aluminium.

B represents a disk rotating in a vertical plane and making frictional contact with the surface of the sphere A. The disk B is fixed upon a shaft $B'$, and the latter is mounted in fixed antifriction-bearings $B^2$. The shaft $B'$ corresponds to the shaft the speed of rotation of which is to be measured, and this shaft may be connected to the shaft whose speed of rotation is to be measured by any convenient or suitable way.

C represents a disk rotating in a vertical plane at right angles to the plane of rotation of the disk B and making frictional contact with the surface of the sphere A. The disk C is fixed upon a shaft $C'$, which is mounted in stationary antifriction-bearings $C^2$. The shaft $C'$ is geared in any suitable way, such as shown in the drawings, to a clockwork mechanism operated by a spring $C^3$ or any other suitable means of propulsion by means of which a rotation may be given to the shaft $C'$ and the disk C thereon. In order to render the speed of the shaft $C'$ uniform, a governor, composed of flexible arms $C^4$, carrying weights $C^5$, is mounted upon the shaft $C'$. One end of each of the arms $C^4$ is fixed to a boss or disk $C^6$, fixed upon the shaft $C'$, and the opposite ends of said flexible arms $C^4$ are fixed to a sleeve $C^7$, mounted loosely upon the shaft $C'$. A brake-disk $C^8$ is connected to the sleeve $C^7$, and fixed near the upper face of the brake-disk $C^8$ is a plate $C^9$, so that an excessive speed of the shaft $C'$ will be arrested by the friction of the brake-disk $C^8$ against the fixed plate $C^9$ by reason of the said brake-disk being drawn toward the plate upwardly by the bending of the flexible arms $C^4$, due to the weights $C^5$ flying outwardly by the force of the rotation of the shaft $C'$. By this arrangement of the governor the speed of rotation of the shaft $C'$ may be made practically uniform and constant, and this is esssential, inasmuch as the speed of rotation of the shaft $B'$ is to be determined by comparison with the speed of rotation of this shaft $C'$.

D and E represent disks or wheels mounted in fixed antifriction-bearings $D^2$ and $E^2$. These disks D and E are located opposite the disks B and C, respectively, and the planes of rotation correspond to the planes of rotation of the said disks B and C, as will be clearly seen in Fig. 1 of the drawings. The disks B and C serve merely as guides for the sphere A. The sphere A is mounted up in a small idle disk F, carried in a support $F'$, having antifriction-bearings $f'$, which permit of a rotation in a horizontal plane of the disk F and its support $F'$. The support $F'$ of the disk F is provided with an arm $F^2$, rigid therewith, and in the end of which arm is mounted an idle disk $F^3$, which also is arranged to rotate in contact with the surface of the sphere. The idle disk $F^3$, mounted in the arm $F^2$ on the support $F'$ of the idle disk F, serves, by reason of its frictional contact with the surface of the revolving sphere, to maintain the axis of rotation of the idle disk F parallel to the axis of rotation of the sphere.

H represents a graduated arm, and I represents a pointer or index-arm hinged at I' to a pin I², pivoted to rotate in a cross-arm or support I³. The index arm or pointer I is so hinged to the pivot-pin I² as to rotate in a horizontal plane therewith and be capable of a swinging movement in a vertical plane.

An idle disk or roller I⁴, mounted in bearings I⁵, carried by the index arm or pointer I, is arranged to rotate in frictional contact with the surface of the sphere A, as is shown in Fig. 2 of the drawings, and a spring I⁶ is provided for exerting a downward pressure upon the index arm or pointer I, thus increasing the friction between the disk or roller I⁴ and the surface of the sphere.

The operation of the device is as follows: Assuming that the shaft B' and the disk B thereon, as well as the disks D and E, are idle, rotation of the shaft C' and the disk C thereon in contact with the surface of the sphere causes the sphere to roll or revolve about a horizontal axis at right angles to the plane of rotation of the disk C, it being understood that the direction of rotation of the disk C and its shaft C' is that indicated by the arrow c in Fig. 2, which will cause a rotation of the sphere in the direction of the arrow a, also seen in Fig. 2. During this rolling of the sphere A under the action of the disk C alone the disks B and D will remain stationary and the guide-disk E and the supporting disk or roller F and its follower-disk F³, as also the disk or roller I⁴ on the index-pointer, will be caused to rotate by frictional contact with the surface of the sphere. The disk or roller F³ will follow the plane of rotation of the sphere, as will also the roller I⁴ on the index-pointer, and the roller I⁴, following the plane of rotation of the sphere, causes the pointer I, in the case above assumed, to stand at the intermediate point on the graduated arc H. It should be understood that the rotation of the disk C may be continuous and is always in the same direction. Now assume that the shaft B' and the disk B thereon be caused to rotate by connection with a rotating shaft the speed of rotation of which is to be measured. This rotation of the disk B in contact with the surface of the sphere in a plane at right angles to the plane of rotation of the disk C causes the plane of rotation of the sphere to shift from a plane parallel with the axis of rotation of the disk C. If the shaft B' and the disk B be rotated, the plane of rotation of the sphere will be shifted to an angle intermediate between the plane of rotation of the disks C and B and the degree of variation in the plane of rotation of the sphere will depend upon the comparative speeds of rotation of the disk C and the disk B. The rotation of the disk B in one direction causes the shifting of the plane of rotation of the sphere to the left, while the rotation of the disk B in the opposite direction causes the shifting of the plane of rotation of the sphere in the opposite direction from its intermediate plane of rotation coinciding with the plane of rotation of the disk C. As the plane of rotation of the sphere shifts the roller I⁴, having frictional contact with the surface of the sphere, causes the pointer I to shift its direction and follow the plane of rotation of the sphere to the right or left of its central point, as shown in Fig. 1, according to the direction of rotation of the disk B. The arc H would be graduated from the central point in opposite directions to correspond with the variations in speed intended to be indicated thereon. From the foregoing it will be seen that the greater the speed of rotation of the disk B as compared with the speed of rotation of the disk C the greater will be the variation of the plane of rotation of the sphere, and consequently the greater will be the movement of the point of the index-arm I to the one side or the other of its central or zero point. Thus if the speed of rotation of the disk B be exactly equal to the speed of rotation of the disk C the pointer I will assume a position on the graduated arc exactly one-half way between its zero or intermediate point and one end of the arc, according to the direction of the rotation of the disk B.

The graduations and markings on the arc H in practice may readily be laid out upon the graduated scale by computing the angles of variation for varying speeds of the surface of the sphere contacting with the disk B, the speed of the disk C, and consequently the speed of rotation of that portion of the surface of the sphere in contact therewith being known.

I do not wish to limit myself to the centrifugal governor for the shaft C' herein shown and described, as this form of governor is shown merely for the purposes of illustration, and it may be preferable to vary the style of the governor used to suit conditions. Thus on shipboard a centrifugal governor would be unsatisfactory and some other style would be used to give more satisfactory results.

Having thus described my invention, what I claim, and desire to secure by Letters Patent of the United States, is—

1. In a speed-indicator, the combination with a loosely-mounted rotatable sphere; and means for imparting to said sphere a rotation tending to a predetermined plane; of means for communicating to the said sphere the rotative speed to be measured, at an angle to the plane in which the sphere tends to rotate; and means for indicating the variations in the plane of rotation of the sphere, substantially as described.

2. In a speed-indicator, the combination with a freely-supported sphere; a disk making contact with the surface of said sphere; and means for imparting to the said disk a uniform speed; of a disk making contact with the surface of said sphere and arranged to rotate in a plane at right angles to the plane of rotation of the first disk, the speed of rotation of the first disk being known, and the speed of rotation of the second disk being variable; and means for indicating the variations in the plane of rotation of the sphere due to the comparative speeds of the two disks, substantially as described.

3. In a speed-indicator, the combination with a loosely-mounted rotatable sphere; and means for imparting to said sphere a rotation tending to a predetermined plane; of means for communicating to the said sphere the rotative speed to be measured at an angle to the plane in which the sphere tends to rotate; a pivoted pointer or index-arm; and a roller carried by said pointer or index-arm making frictional contact with the surface of the sphere and arranged to follow the plane of rotation of the said sphere, substantially as described.

4. In a speed-indicator, the combination with a loosely-mounted rotatable sphere; and means for imparting to said sphere a rotation tending to a predetermined plane; of means for communicating to the said sphere the rotative speed to be measured at an angle to the plane in which the sphere tends to rotate; a graduated arc; a pivoted pointer or index-arm; and a roller carried by said pointer or index-arm making frictional contact with the surface of the sphere and arranged to follow the plane of rotation of the said sphere, substantially as described.

5. In a speed-indicator, the combination with a loosely-mounted rotatable sphere; anti-friction-bearings supporting said sphere; and means for imparting to said sphere a rotation tending to a predetermined plane; of means for communicating to the said sphere the rotative speed to be measured, at an angle to the plane in which the sphere tends to rotate; and means for indicating the variations in the plane of rotation of the sphere, substantially as described.

6. In a speed-indicator, the combination with a loosely-mounted rotatable sphere; means for imparting to said sphere a rotation tending to a predetermined plane; and means for guiding said sphere; of means for communicating to the said sphere the rotative speed to be measured, at an angle to the plane in which the sphere tends to rotate; and means for indicating the variations in the plane of rotation of the sphere, substantially as described.

7. In a speed-indicator, the combination with a freely-supported sphere; a rotatable disk making contact with the surface of said sphere; a motor for rotating said disk; and a governor controlling the speed thereof; of a disk of variable speed making contact with the surface of said sphere and arranged to rotate in a plane at right angles to the plane of rotation of the first disk; and means for indicating the variations in the plane of rotation of the sphere due to the comparative speeds of the two disks, substantially as described.

8. In a speed-indicator, the combination with a loosely-mounted rotatable sphere; anti-friction-bearings supporting said sphere; and means for imparting to said sphere a rotation tending to a predetermined plane; of means for communicating to the said sphere the rotative speed to be measured, at an angle to the plane in which the sphere tends to rotate; a pivoted pointer or index-arm; and a roller carried by said pointer or index-arm making frictional contact with the surface of the sphere, and arranged to follow the plane of rotation of the said sphere, substantially as described.

9. In a speed-indicator, the combination with a loosely-mounted rotatable sphere, and a frictional device for imparting to said sphere a rotation tending to a predetermined plane; of a frictional device for communicating to the said sphere the rotative speed to be measured, at an angle to the plane in which the sphere tends to rotate; a graduated arc; a pivoted pointer or index-arm; and a roller carried by said pointer or index-arm making frictional contact with the surface of the sphere and arranged to follow the plane of rotation of the said sphere, substantially as described.

In testimony whereof I affix my signature in presence of two witnesses.

GREGORY CALDWELL DAVISON.

Witnesses:
PAUL C. CHILD,
H. A. SHERMAN.